March 21, 1967     W. S. FORTUNE     3,310,733
HIGH VOLTAGE SWITCHING INSTRUMENT
Filed July 29, 1963     2 Sheets-Sheet 1

WILLIAM S. FORTUNE
INVENTOR.

BY
Nilsson, Robbins & Anderson
ATTORNEYS

WILLIAM S. FORTUNE
INVENTOR.

United States Patent Office 3,310,733
Patented Mar. 21, 1967

3,310,733
HIGH VOLTAGE SWITCHING INSTRUMENT
William S. Fortune, 14100 Jouett St.,
Pacoima, Calif. 91331
Filed July 29, 1963, Ser. No. 298,101
10 Claims. (Cl. 324—18)

This invention relates generally to devices for selectively routing electric currents and more particularly to such devices which may be utilized in switching currents at very high voltages.

The present invention finds particularly useful application in high voltage ignition systems for internal combustion engines; and a large proportion of the examples and their accompanying discussion presented herein relate to instrumentation for testing and analyzing the operation of such engines. However, the invention is not limited to such examples or combinations and is useful in any application where high voltage signals might otherwise arc over or cause leakage currents between adjacent switching posts or contacts.

It is highly desirable in ignition testing systems that the operator be able to observe selectively the ignition signal associated with each spark plug in the engine. It is further desirable that the selection be achievable remotely as at the operator's panel or in the cockpit without routing the dangerously high voltage currents out of the engine compartment or into the operator's space. In this manner, the signals can be observed dynamically under actual engine loading conditions.

In this connection, it is noted that it is desirable, and frequently essential, for safe, satisfactory, or economical performance of an engine, that its ignition system and combustion chambers be in good operative condition. If, for example, a combustion chamber loses compression or has a faulty spark plug, the operating efficiency of the engine, as well as its dependability, may be seriously impaired without knowledge thereof by the operator. Heretofore, even when a skilled operator was aware of such degraded performance he was unable generally to know which component in which system in the engine was faulty.

Possible alternatives to a dynamic testing system, which provides constant opportunity to observe ignition or other combustion conditions throughout the engine during actual operation, are undesirably expensive or otherwise impracticable. For example, it is possible to be fairly certain of the condition of the spark plug gaps electrodes and insulators by merely replacing them after ten to one hundred hours of use depending upon the use conditions and dependability required. This practice is not only wasteful of labor and spark plugs, but does not assure the good condition of the other ignition components and connections and the like.

Another alternative is a number of static testing instruments which generally are not portable and which are neither satisfactorily versatile nor capable of accurate indications of component condition under actual dynamic load conditions. Still another alternative testing system is a dynamic engine analyzer, such as a dynamometer which is extremely expensive, requires a special building for its installation and use, and requires a specially trained technician to operate it.

Other attempts to provide devices for testing ignition systems under actual load conditions have suffered from compromises in accuracy or versatility or have generally been impractical because they either required a prohibitively large amount of equipment mounted under the hood; were not readily or safely observable by the operator; required that the dangerously high ignition voltage be present on the operator's panel or dashboard; involved an impractical, complex system or variable calibrated gaps; caused extensive radio interference in the airplane, boat or automobile; required the removal of the ignition signal from the system from an individual spark plug during the test; or were not able to monitor continuously the operation of the system or component but required rather that a deliberate test be made when considered to be needed or otherwise indicated.

A compact dynamic testing system which is mounted in the engine compartment and which permits the observation, selectively, of high voltage signals in the different portions of the ignition system requires a remotely operable high voltage switching device for impressing a particular high voltage ignition system signal upon a particular indicating device. Such switching devices as have been heretofore available, for example, conventional high voltage stepping switches, have suffered the disadvantages of being not remotely or electrically operable, not reliable regarding arcing and other leakage currents for a reasonable span of instrument lifetime, or too bulky, costly or complex to be practicable in such a portable system.

It is therefore an object of the present invention to provide a high voltage switching instrument which is not subject to these and other disadvantages of the prior art.

It is another object to provide a high voltage stepping switch which is not subject to arcing or other leakage currents.

It is another object to provide such a high voltage stepping switch which is remotely operable and which provides at the operator's position an indication of its state of coupling.

It is another object to provide such a high voltage stepping switch which may be solenoid actuated but which does not depend critically upon the solenoid's current, or the amount of wear experienced by its moving parts, for reliable operation.

It is another object to provide an ignition signal switching and dynamic testing instrument for selectively observing and measuring the voltage or impedance at each spark plug of the different combustion cylinders of an engine.

It is another object to provide such an instrument which is reliable, inexpensive, and easily installed and utilized by unskilled persons.

These and other objects are achieved in accordance with one example of the present invention which includes nine switching chambers arranged in a circle about the inner periphery of a cylindrical housing body member. Each of the switching chambers is isolated from the adjacent one by a solid dielectric barrier. Eight of the chambers each have a stationary contact disposed within the chamber and the dielectric barrier forms a substantially elongated or tortuous path for any breakdown currents thereover between the stationary contacts of adjacent chambers.

A movable contact is supported upon a rotary member the axis of rotation of which is concentric with said circle and said cylindrical body member. The rotary member is formed of solid dielectric material and is adapted to be rotated from one of said switching chambers to the next by a rotational force applied to its axial shaft. The rotary member in this example is effectively hinged to provide a degree of freedom for movement of the movable contact axially and radially away from the stationary contact in a switching chamber when the rotary member is given an angular displacement through rotation of its axial shaft. The dielectric barrier and the rotary member are cooperatively shaped and adapted with inclined surfaces thusly to resolve angular motion of the movable contact into motion which also makes or breaks connection between the contacts without sliding, scraping or scrubbing of the contact surfaces. The movable contact is lifted out of one switching chamber and dropped into the next without its metallic surface contacting any substance enroute. This reduces wear on the contact surfaces and precludes metallic tracks which can lead to high voltage breakdown or other leakage current phenomena.

The movable contact of the rotary member is coupled to an axial conductive pin member which constitutes the movable electrode of the gap voltmeter. This electrode is supported by a dielectric cap member which is threaded over the cylindrical housing body member. The electrode is moved or adjusted axially by the degree of threaded connection between the cap and body members. A micrometer type scale related to the thread pitch is disposed on the body member, or "barrel," and the cap member, or "thimble."

A stationary gap electrode is axially spaced in a cooperative relationship with the movable electrode and is spaced from its inner end opposite from its connection with the cap member. The stationary electrode is coupled to a glow discharge indicator lamp which may be remotely positioned as in the operator's compartment. Illumination energy for the lamp is supplied when the gap is adjusted to be short enough for the voltage on the stationary contact, with which the movable contact on the rotary member is in contact, to arc across the gap. Thus if the stationary contact is coupled to a high voltage terminal of a particular spark plug and the voltmeter gap is preset for a "good" spark plug and the indicator lamp is energized, it may be concluded that the particular spark plug has eroded electrodes, is unconnected, or is otherwise presenting an excessively large impedance to the ignition signal.

The rotary member may be advanced sequentially from switching chamber to switching chamber by a solenoid driven ratchet which is advanced one notch each time the solenoid is energized. The rotary member may also be advanced manually by a knob which is mechanically coupled to the shaft of the rotary member.

A rotary tracking switch also attached to the shaft of the rotary member may in combination with a plurality of indicator lamps, be utilized to indicate in which switching chamber the movable contact is positioned. The tracking switch may also be wired to advance automatically the movable contact from the seventh and eighth or other switching chambers when the instrument is utilized in a system for observing less than eight different high voltage signals. A cleansing pad for the movable contact and lubricant for the dielectric materials may be disposed in the ninth or "off" switching chamber.

Further details of these and other novel features and their principles of operation, as well as additional objects and advantages of the invention will become apparent and be best understood from a consideration of the following description when taken in connection with the accompanying drawings which are all presented by way of illustrative example only, and in which.

Referring to the figures, it is emphasized that the detailed showing is by way of example only and is presented in the cause of providing what is believed to be the most useful and readily understood description of the principles of the invention. The details shown are not to be taken as a limitation upon the scope of the invention which is defined by the appended claims forming a part of this specification.

Figures 1, 3:
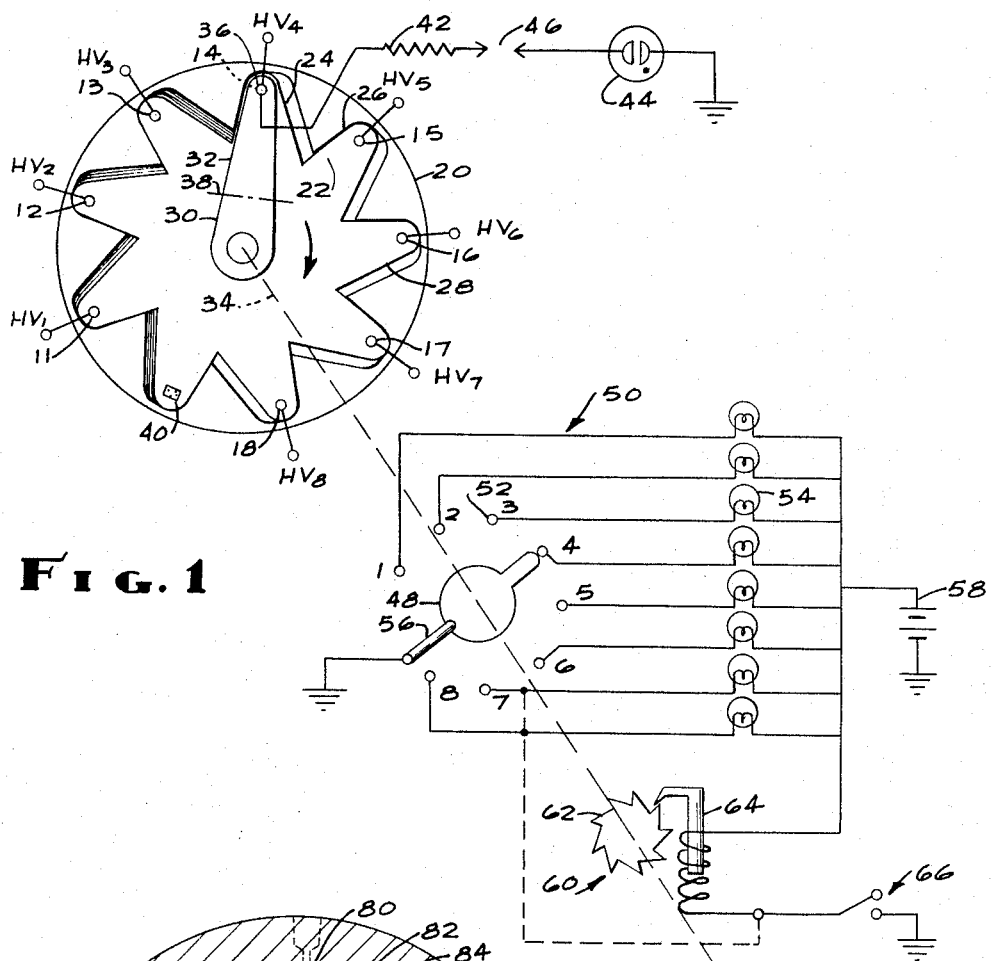
FIG. 1 is a schematic view of an exemplary embodiment of a high voltage switching instrument and indicator constructed in accordance with the principles of the present invention.
FIG. 3 is a sectional view of the apparatus depicted in FIG. 2 taken along the lines 3—3 thereof.

In the diagram of FIG. 1, a system is illustrated for indicating the existence and magnitude of eight different high voltage terminals indicated as $HV_1$ through $HV_8$. Each of these high voltage terminals is coupled by a lead to a contact 11–18 respectively. Each of the eight contacts is disposed on a stationary body member 20 and each of the contacts is separated by a barrier 22. The barriers are fabricated of solid dielectric having a high electrical breakdown potential and which constitute a three-dimensional elongated path between adjacent contacts which any leakage currents must traverse. Each of the barriers in this example has an inclined ramp 24 on its counter-clockwise side as viewed in the drawing and a non-inclined edge 26 on its clockwise side. The space between adjacent barriers 22 defines a switching chamber 28.

A rotary member 30 is disposed with its axis of rotation concentric with the center of the circle about which the stationary contacts are disposed and with the axis of the cylindrical body member 20. The rotary member 30 includes an extended radial arm 32 which may be angularly displaced in a clockwise direction from switching chamber to switching chamber when the axial shaft 34 of the rotary member 30 is rotated. The radial arm 32 supports a movable contact 36 which is positioned thereon in a manner to make contact with the stationary contacts supported within the switching chambers on the stationary body member 20. The radial arm 32 is effectively hinged about a joint 38 and a spring biasing means, not shown, is provided to urge the radial arm 32 downwardly, into the plane of the drawing, into firm contact with the stationary contact within the switching chamber. The same biasing means also assures a precise positioning of the radial arm 32 over the stationary contact, in the event of an overshoot, by urging the radial arm 32 backwardly, counter-clockwise, down the ramp 24.

The ninth or "off" switching chamber of the assembly may have disposed therein a cleaning pad 40 for cleansing the movable contact 36 each time it is brought to rest in that switching chamber.

The movable contact 36 is coupled, through the axial shaft 34, to a current limiting resistor 42, which may vary widely in value depending upon the particular application, and thence to a glow discharge indicator lamp 44 which may be returned to ground. Interposed between the resistor 42 and the lamp 44 is, in this example, an adjustable voltmeter gap 46. In alternative embodiments the gap 46 is replaced by appropriate, albeit more complex, circuitry. The length of the gap 46, as will be discussed more fully below, may be adjusted so that the lamp 44 just begins to glow. The length of the gap 46 is then a direct measure of the magnitude of the high voltage at the stationary contacts with which the movable contact 36 is in electrical connection.

The axial shaft 34 is also coupled to the rotary contact 48 of a tracking switch 50. The switch 50 has nine different positions, eight of which are associated respectively with ones of the stationary contacts on the high voltage switch previously described. Each of the eight positions corresponding to the eight high voltage contacts of the body member 20 has a stationary low voltage contact 52 which is coupled to a particular one of a different low voltage indicator lamp 54. The movable contact 48 of the tracking switch 50 is in this example continuously connected to ground potential through a sliding contact 56. The terminal of each of the indicator lamps 54 opposite from that coupled to the tracking switch 50 is connected to a low voltage source of potential 58. Thus if one of the indicator lamps 54 is energized, it is an indication that the radial arm 32 is in contact with a particular one of the stationary contacts on the body member 20 and that the voltmeter gap 46 and indicator lamp 44 are at that time associated with that particular high voltage terminal.

A ratchet drive 60 is connected to the axial shaft 34 for electrically advancing the radial arm 32 between adjacent ones of the switching chambers. The ratchet drive 60 comprises a ratchet gear 62 having nine teeth and a solenoid plunger unit 64 which is mechanically coupled to the gear ratchet 62 so that it is advanced by one notch each time the solenoid is energized. One terminal of the solenoid is connected to the source of potential 58 and the other terminal is coupled to a momentary contact switch 66, the opposite terminal of which may be returned to ground. All of the indicator lamps as well as the momentary contact switch 66 may be mounted in a remote position as in the operator's compartment or cockpit.

An additional or alternative means for advancing the rotary member 30 and for indicating its location with respect to the plurality of switching chambers is a knob 68 and indicator 70 which may be mounted on the body member 20 as for compact outboard engines or disposed in a remote position and coupled to the axial shaft 34 by a flexible cable.

Figure 2:
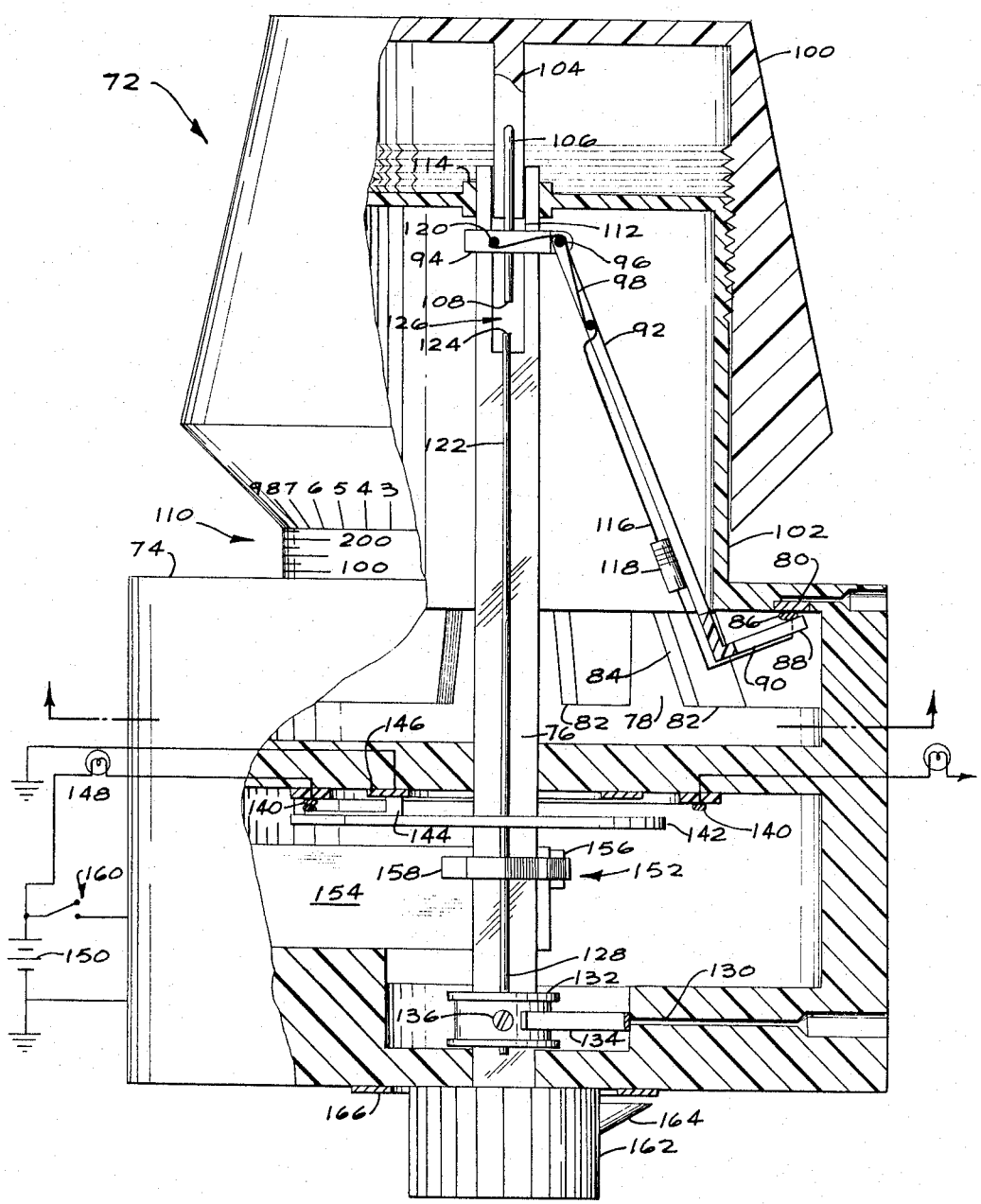
FIG. 2 is a partially sectioned view of an alternative embodiment of a high voltage stepping switch and gap voltmeter embodying the principles of the present invention.

Referring to FIG. 2 and FIG. 3, a view of the invention including more of its physical details is illustrated. Although many of the details in these figures correspond closely with those of FIG. 1, different reference numerals will be used throughout to preclude any possibility of confusion to the reader. In some instances, the correspondence of like parts will be noted when deemed to be particularly appropriate.

The assembly 72 comprises a cylindrical body member 74 along the axis of which is housed and supported an axial shaft member 76. Disposed about the periphery of the cylindrical body member 74 are a series of switching chambers 78, eight of which may include therewithin a stationary contact 80. Each of the switching chambers 78 is defined and separated by a dielectric vane or barrier 82, the inner edge 84 of which may be inclined to form a ramp for cooperatively resolving the motion of a movable contact 86 which is supported on the tip 88 of a contact support arm 90. The contact support arm 90 is an extended portion of a radial arm 92 which is supported on the axial shaft member 76 with a hub 94. The radial arm 92 is connected to the hub 94 by means of a hinge 96 which permits the radial arm 92 and its extended members including the contact support arm 90 to move radially inwardly and outwardly. A spring member 98 biases the radial arm 92 radially outwardly in a manner to urge the movable contact 86 upwardly or axially into firm electrical contact with the stationary contact 80. The hub 94 is rotationally affixed to the axial shaft member 76.

A cap member 100 is disposed in screw thread engagement with a reduced diameter cylindrical portion 102 of the assembly 72. A voltmeter electrode support 104 is centrally disposed within the cap member 100 and rigidly grips the upper end of a conductive electrode 106. The vertical displacement of the conductive electrode 106 and particularly its lower end 108 is precisely determined by the threaded position of the cap member 100 with respect to the cylindrical portion 102 of the assembly 72. A micrometer type scale 110 is provided as illustrated for purposes of determining and measuring an axial position of the lower end 108 of the conductive electrode 106. The upper end, as viewed in the drawing, of the axial shaft member 76 is centrally relieved to form a bore 112 which slidably receives and radially supports or stabilizes an electrode support 104. The upper end of the reduced diameter cylindrical portion 102 is centrally relieved to form a bushing 114 within which the upper end of the axial shaft member is journalled. In this manner, and due to the dielectric support of the electrode 106, the latter may be moved up and down without the possibility of creating metallic tracks from frictional contact with other members.

Electrical connection between the movable contact 86 and the electrode 106 is maintained by a conductor 116 which includes a current limiting resistor 118 and which is connected to the conductive spring member 98, the other end of which is conductively continuously urged against a pin member 120 which passes through the hub 94 and makes sliding contact with the conductive electrode 106. Alternatively, as indicated in the figure by a dotted reference line, the current limiting resistor 118 may be interposted in the length of a stationary voltmeter electrode 122 disposed along an axis of the axial shaft member 76 and having an end 124 which projects into the bottom of the bore 112 to form an adjustable voltmeter gap 126 in cooperation with the bottom end 108 of the movable voltmeter electrode 106. The opposite end portion 128 of the stationary voltmeter electrode is coupled to an output lead socket 130 through a slip ring or collet 132 and a conductive brush 134. The slip ring is connected to the end portion 128 by means of a conductive set screw 136. In practice, the voltmeter gap 126 may be zeroed with respect to the scale 110 by loosening the set screw 136 and pulling the electrode 122 a short distance upwardly into the bore 112. The cap member 100 may then be threaded downwardly until the scale 110 reads "zero" thusly driving the electrode 122 downwardly to its proper "zero" position. The set screw 136 may then be tightened to retain permanently the proper position for the upper end 124 of the electrode 122 with respect to the movable electrode 126.

A rotary tracking switch 136 is provided which includes a set of stationary contacts 140 each of which corresponds to one of the stationary high voltage contacts 80. A rotary portion 142 is rotationally affixed to the axial shaft member 76 and selectively connects one of the stationary contacts 140 through a brush member 144 to a conductive slip ring 146 which may be grounded as indicated in this example. The slip ring may be "printed" on a rigid dielectric disc. Each of the stationary contacts is connected to an indicator lamp 148 which may be, as illustrated in the schematic view of FIG. 1, connected also to a source of potential 150. Thus a particular lamp 148 will be illuminated when its associated contact 140 is connected to ground through the brush member 144 on the rotary portion 142 of the tracking switch.

The axial shaft member 76 is rotationally advanced by a ratchet drive solenoid 152 which includes a solenoid 154, a solenoid plunger ar armature 156 and a ratchet gear 158. The solenoid 154 may be energized from a source of potential 150 through a momentary contact switch 160, and the ratchet drive is readily designed by conventional techniques to cause it to advance one notch and only one notch for each surge of current supplied through the momentary contact switch 160.

As indicated previously, an additional or alternative method for indicating angular position of the radial arm 92 may be provided by a manually operable knob 162 having an indicator pointer 164 affixed thereto and disposed in rotational indicating relationship with a fixed dial 166.

The preceding discussion applies with full validity to the sectional view of FIG. 3. However, the layout of the switching chamber 78 and the rotary member 92 are more clearly illustrated in FIG. 3. The inner edge 84 of each of the dielectric barriers 82 is, as previously described, inclined to form a ramp the angle of inclination of which is not highly critical. It may be of the order of 45° with respect to the axis of the cylindrical assembly 72. A bearing extension member 168 of the radial arm 92 is provided in a plane substantially parallel with the contact support arm 90. A leading bearing edge 170 is disposed to bear slidably against the inner edge or ramp 84 of the dielectric barriers 82. As the axial shaft member 76 is rotated counter-clockwise, as viewed in the drawing, to advance the contact support arm 90 from one switching chamber to the next, the radial arm 92 is rotated counter-clockwise and the leading bearing edge 170 immediately bears against the ramp 84. This causes the angular motion of the bearing extension member 168 to be resolved into components including a movement of the radial arm inwardly and therefore the arm 90 and member 168 downwardly, as viewed in FIG. 2, or outwardly from the plane of the paper, as viewed in FIG. 3, thereby lifting the movable contact 86 away from the stationary contact 88 without sliding motion therebetween. Further counter-clockwise motion of the radial arm 92 causes the contact support arm to be lifted even further until it is completely cleared of one of the switching chambers and dropped into the next. If the thrust from the driving solenoid is too great and thus causes a slight overshoot beyond proper contact with the stationary contact in the succeeding switching chamber, the biasing action of the spring 98, in cooperation with the inclined bearing surfaces on the bearing extension member 168 and the inner surface 84 of the dielectric barrier 82, causes the contact support arm promptly to settle back to achieve the proper contact between the stationary and movable contacts 88, 86.

Thus it may be seen that there is substantially no wear experienced by the metallic contacts and no grinding or scrubbing thereof to cause conductive particles which could eventually deleteriously effect the insulating properties of the dielectric barriers 80, 82. In addition, since the movable metallic contact 86 does not contact even dielectric substance during its motion, it cannot form conductive tracks in the dielectric which could eventually form leakage paths for the high voltage current between adjacent stationary contacts. In order further to preclude stray metallic particles from reaching the contacts and to clean continuously the movable contact 86, a cleansing pad 172 of highly absorbent fabric may be placed within the "off," ninth, switching chamber.

There has thus been disclosed a high voltage stepping switch and voltage indicating instrument which achieves the objects and exhibits the advantages hereinabove set forth.

What is claimed is:

1. A high voltage rotary stepping switch comprising: a housing body; a plurality of switching chambers disposed along a circle and each separated from an adjacent one by a solid dielectric inclined ramp barrier; a plurality of high voltage, stationary contacting means disposed one each in said switching chambers and disposed substantially in a plane perpendicular to the axis of said circle, the surfaces of said ramp barriers defining an extended tortuous path as the shortest distance thereover between the high voltage stationary contacting means of adjacent ones of said switching chambers; a rotary armature assembly including a radially extended member having movable contacting means carried thereon, said movable contacting means being engageable with said stationary contacting means; force biasing means carried by said armature assembly for urging said movable contacting means against said stationary contacting means; motivation means for rotating said armature assembly about said axis and urging said movable contacting means sequentially from contact with one of said stationary contacting means to an adjacent one, said dielectric ramp barrier including surfaces engageable slidably with the surfaces on said rotary armature assembly whereby the motion of said movable contacting means between adjacent stationary contacting means includes a component of action in a direction parallel to said axis thereby lifting said extended member and movable contacting means of said armature assembly in opposition to said force biasing means and away from its previous contact with one of said stationary contacting means, carrying it without frictional contact by said movable contacting means, and then dropping it into contact with the stationary contacting means of the adjacent chamber.

2. The invention according to claim 1 in which said rotary armature assembly includes a central shaft member; and said radially extended member includes an arm having one portion thereof affixed to said shaft and a second portion which carries said movable contacting means and hinge means flexibly interconnecting said arm portions.

3. The invention according to claim 2 in which said force biasing means includes a spring connected to said hinge means and carried at least in part by said arm and adapted to urge said movable contact means of said second portion thereof into contact with one of said stationary contacting means.

4. The invention according to claim 3 which further includes: an axially stationary conductor carried by said central shaft and having a voltmeter gap first end; an axially adjustable conductor having a voltmeter gap second end which is axially juxtaposed with respect to said gap first end; adjustable mounting means for said axially adjustable conductor, said mounting means being screw threadedly supported by said housing body in a manner whereby rotation of said mounting means with respect to said housing body about said axis selectively increases and decreases the magnitude of axial spacing of said voltmeter first and second gap ends.

5. The invention according to claim 4 in which said mounting means and said housing body include externally readable, micrometer type cooperating indices for determining said magnitude of axial spacing.

6. The invention according to claim 4 which includes: conduction indicator means; first commutating means for connecting one of said conductors to said movable contacting means carried by said arm; and second commutating means for connecting the other of said conductors to said indicator means.

7. The invention according to claim 4 which includes current limiting means interposed in the conductive path between said movable contacting means and said indicator means.

8. The invention according to claim 4 which includes a cleaning pad disposed in one of said switching chambers for cleaning said movable contacting means.

9. The invention according to claim 4 in which said second portion of said arm is forked into a pair of rigidly interconnected extending members, one of which carries said movable contacting member and does not contact said ramp barriers and the other of which is adapted to slidingly engage said barriers whereby said movable contacting means is lifted out of contact with said stationary contacting means without experiencing frictional wear.

10. The invention according to claim 4 in which said motivation means includes a ratchet driving solenoid mechanism supported on said housing body and a ratchet wheel affixed to said shaft, said ratchet having a plurality of ratchet teeth which are angularly spacially synchronized one to one with said plurality of switching chambers.

References Cited by the Examiner

UNITED STATES PATENTS

| | | | |
|---|---|---|---|
| 1,450,896 | 4/1923 | Pache | 324—18 X |
| 1,626,463 | 4/1927 | Harrington. | |
| 1,961,558 | 6/1934 | Guziel et al. | 324—18 |
| 1,983,331 | 12/1934 | Amsden | 200—4 X |
| 2,254,080 | 8/1941 | McCarty | 324—17 |
| 2,376,691 | 5/1945 | Hasselbaum | 324—16 |
| 2,482,016 | 9/1949 | McCoy | 324—17 |
| 2,665,343 | 1/1954 | Benson | 200—65 |
| 3,119,905 | 1/1964 | Nicolaus | 200—105 |

WALTER L. CARLSON, *Primary Examiner.*

A. E. RICHMOND, M. J. LYNCH,
*Assistant Examiners.*